(12) United States Patent
Kim

(10) Patent No.: US 9,369,003 B2
(45) Date of Patent: Jun. 14, 2016

(54) SMARTKEY OPERATING SYSTEM EQUIPPED WITH WIRELESS CHARGING FUNCTION AND OPERATING METHOD THEREOF

(71) Applicant: HYUNDAI MOBIS Co., Ltd., Yongin-si (KR)

(72) Inventor: Jae Woo Kim, Yongin-si (KR)

(73) Assignee: HYUNDAI MOBIS CO., LTD., Yongin-si (KR)

( * ) Notice: Subject to any disclaimer, the term of this patent is extended or adjusted under 35 U.S.C. 154(b) by 119 days.

(21) Appl. No.: 14/259,737

(22) Filed: Apr. 23, 2014

(65) Prior Publication Data
US 2015/0022143 A1    Jan. 22, 2015

(30) Foreign Application Priority Data

Jul. 17, 2013    (KR) .................. 10-2013-0084213

(51) Int. Cl.
*H02J 7/00* (2006.01)
*H02J 9/00* (2006.01)
*H02J 17/00* (2006.01)
*H02J 7/02* (2016.01)

(52) U.S. Cl.
CPC ................ *H02J 7/025* (2013.01); *H02J 9/005* (2013.01); *H02J 17/00* (2013.01)

(58) Field of Classification Search
CPC ............ H02J 7/025; H02J 9/005; H02J 17/00
USPC ................................................. 320/108, 109
See application file for complete search history.

(56) References Cited

U.S. PATENT DOCUMENTS

| | | | | |
|---|---|---|---|---|
| 8,310,201 B1* | 11/2012 | Wright | .................. | G08C 17/02 320/107 |
| 2008/0197712 A1* | 8/2008 | Jin | .......................... | H02J 5/005 307/104 |
| 2010/0145542 A1* | 6/2010 | Chapel | ................ | H02J 13/0082 700/295 |
| 2010/0156343 A1* | 6/2010 | Jung | ....................... | H02J 5/005 320/108 |
| 2011/0081857 A1* | 4/2011 | Lee | ...................... | G06K 7/0008 455/41.1 |

(Continued)

FOREIGN PATENT DOCUMENTS

CN    102769498 A    11/2012
CN    103053093 A    4/2013

*Primary Examiner* — Phallaka Kik
(74) *Attorney, Agent, or Firm* — NSIP Law

(57) ABSTRACT

Provided are a smartkey operating system equipped with a wireless charging function and an operating method thereof, which controls performing of a wireless charging function equipped in a smartkey system, thereby preventing an overlap of frequencies even when there is an overlap section between a wireless charging operating frequency and a low frequency of the smartkey system. The smartkey operating system includes a switching unit configured to cut off or supply the wireless charging power, and a control unit configured to determine whether to cut off the wireless charging power to control the switching unit according to a current mode. When the current mode is a fob search mode, the control unit cuts off the wireless charging power by using the switching unit.

17 Claims, 3 Drawing Sheets

(56) References Cited

U.S. PATENT DOCUMENTS

| | | | | |
|---|---|---|---|---|
| 2011/0148349 A1* | 6/2011 | Kim | ............... | G01D 21/00 320/108 |
| 2012/0140526 A1* | 6/2012 | Martinelli | ............... | H02J 7/35 363/21.06 |
| 2012/0161529 A1* | 6/2012 | Kamata | ............... | H02J 17/00 307/99 |
| 2012/0274276 A1* | 11/2012 | Endo | ............... | B60R 25/2018 320/109 |
| 2013/0187602 A1* | 7/2013 | Bouman | ............... | B60L 11/1811 320/109 |
| 2014/0015328 A1* | 1/2014 | Beaver | ............... | B60L 11/182 307/104 |
| 2014/0285006 A1* | 9/2014 | Xu | ............... | G06F 1/26 307/23 |
| 2014/0300326 A1* | 10/2014 | Yang | ............... | H02J 7/0052 320/162 |
| 2015/0015419 A1* | 1/2015 | Halker | ............... | B60L 11/1827 340/901 |

* cited by examiner

SMARTKEY OPERATING SYSTEM EQUIPPED WITH WIRELESS CHARGING FUNCTION AND OPERATING METHOD THEREOF

CROSS-REFERENCE TO RELATED APPLICATIONS

This application claims priority under 35 U.S.C. §119 to Korean Patent Application No. 10-2013-0084213, filed on Jul. 17, 2013, the disclosure of which is incorporated herein by reference in its entirety.

TECHNICAL FIELD

The present invention relates to a smartkey operating system equipped with a wireless charging function and an operating method thereof, and more particularly, to a smartkey operating system equipped with a wireless charging function and an operating method thereof, which prevent an overlap of frequencies by using a wireless charging function equipped in a smartkey system.

BACKGROUND

Wireless power transmission technology denotes technology that transmits power without using a wire. Transmitting power without a wire is like a magic, but wireless communication technology is being currently used. When the wireless power transmission technology is realized, the ripple effect is very great, and thus, the wireless power transmission technology is attracting much interest. If power of tens W or more is wirelessly supplied, a paradigm of information technology (IT) is expected to be innovatively changed.

In particular, portable IT equipment that is a core of wireless communication technology freely performs wireless communication over a network such as a mobile communication network, a wireless local area network (LAN), or the like. However, the portable IT equipment is supplied with power from a charged battery, and thus, interest in realizing a wireless device is inevitably high. To date, the wireless power transmission technology has been developed, but only a contactless induction coupling scheme has been commercialized.

For example, some research for using a microwave was done in the past so as to transmit high power of tens W or more, but is not actively commercialized due to an influence of the microwave on a human body and straightness based on the use of a high-efficiency antenna. However, high power wireless transmission technology based on a non-radiated scheme, proposed by Marin Soljacic professor team of a physics department of MIT university in 2007, transmits high power of 60 W at a distance of 2 m by using a carrier wave of 10 MHz, and thus is attracting much attention as future promising technology.

In a related art smartkey system, a smartkey electronic control unit (ECU) drives a low frequency (LF) antenna by using an antenna driving IC, and a fob receives a request signal transmitted through the LF antenna to check the request signal, and transmits an identification (ID) in response to the request signal. When a radio frequency (RF) receiver receives the ID, the smartkey ECU determines the received ID as an ID of a vehicle fob to allow a vehicle to start.

When a battery of the fob is discharged, the smartkey ECU drives a base station IC to drive an LF antenna for transponder (TP) communication, and by performing the TP communication with the vehicle fob, the smartkey ECU determines a corresponding ID to allow a vehicle to start.

In the related art, a smartkey system drives an LF antenna to search for a fob, for starting a vehicle, and when a corresponding ID is checked, the smartkey system allows the vehicle to start. Here, the LF antenna uses a frequency of 125 KHz.

Recently, a wireless charging system is equipped in a lot of vehicles, and a frequency that is used for charging in a wireless charger is within the same band as that of a frequency that is used to search for a fob through LF communication. For this reason, frequencies overlap, causing a malfunction.

SUMMARY

Accordingly, the present invention provides a smartkey operating system equipped with a wireless charging function and an operating method thereof, which controls performing of a wireless charging function equipped in a smartkey system, thereby preventing an overlap of frequencies even when there is an overlap section between a wireless charging operating frequency and a low frequency of the smartkey system.

In one general aspect, a smartkey operating system equipped with a wireless charging function, which ordinarily supplies wireless charging power, includes: a switching unit configured to cut off or supply the wireless charging power; and a control unit configured to determine whether to cut off the wireless charging power to control the switching unit according to a current mode, wherein when the current mode is a fob search mode, the control unit cuts off the wireless charging power by using the switching unit.

In another general aspect, a method of operating a smartkey operating system equipped with a wireless charging function, which ordinarily supplies wireless charging power and in which a switch is ordinarily used for wireless charging, includes: cutting off the wireless charging power when a current mode is a sleep mode or a fob search mode; supplying the wireless charging power when the sleep mode or the fob search mode is ended; and switching the switch to be used for data communication when a fob battery is discharged, and an emergency start button is in a turn-on state or a fob diagnosis learning request is acquired.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein.

Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
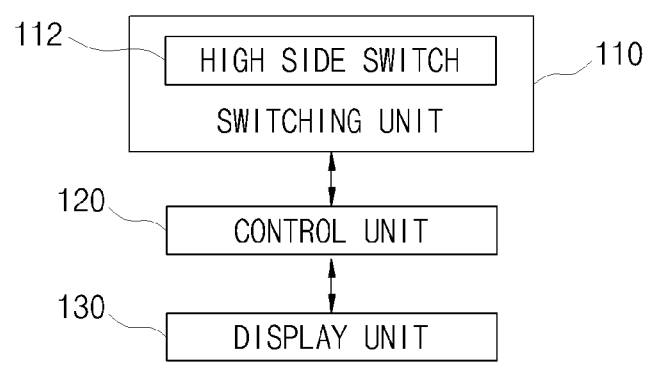
FIG. 1 is a block diagram of a smartkey operating system equipped with a wireless charging function which prevents an overlap of frequencies, according to an embodiment of the present invention.

FIG. 1 is a block diagram of a smartkey operating system equipped with a wireless charging function which prevents an overlap of frequencies, according to an embodiment of the present invention.

As illustrated in FIG. 1, the smartkey operating system equipped with the wireless charging function includes a switching unit 110, a control unit 120, and a display unit 130.

The smartkey operating system equipped with the wireless charging function ordinarily has a default mode that supplies wireless charging power. Here, examples of a mode of the smartkey operating system include the default mode, a sleep mode, and a fob search mode. The default mode is a mode that ordinarily supplies the wireless charging power, and the sleep mode is a mode that consumes a minimum of power. In the sleep mode, the smarkey operating system maintains a sleep state, and then, when an external input is acquired, the smartkey operation system is activated.

The fob search mode is a mode that searches for a fob into which a wireless charger and a smartkey are integrated. In the fob search mode, the smarkey operating system drives an LF antenna to search for a fob.

The switching unit 110 includes a high side switch 112, and supplies or cuts off the wireless charging power by using the high side switch 112.

The control unit 120 determines whether to cut off the wireless charging power to control the switching unit 110 according to a mode. When a current mode is the sleep mode or the fob search mode, the control unit 120 cuts off the wireless charging power. Therefore, when entering the sleep mode, the control unit 120 cuts off the wireless charging power, thereby preventing a dark current from being generated.

Here, when the control unit 120 does not cut off the wireless charging power, power is consumed for supplying the wireless charging power, and thus, the dark current is generated, causing discharging of a vehicle.

When a current mode is not the sleep mode or the fob search mode, namely, when the current mode is the default mode, the control unit 120 allows the wireless charging power to be supplied.

Therefore, when a current mode is the fob search mode, the control unit 120 cuts off the wireless charging power, thereby preventing a low driving frequency from overlapping a wireless charging power frequency.

When a current mode is the sleep mode, the display unit 130 displays a sleep-mode state, or when a current mode is the fob search mode, the display unit 130 displays a fob search-mode state.

That is, in a case (for example, the fob search mode) of desiring to search for a fob into which a wireless charger and a smartkey are integrated, the control unit 120 controls a switching operation to stop a wireless charging operation for a certain time, thereby preventing an overlap of frequencies.

Figure 2:
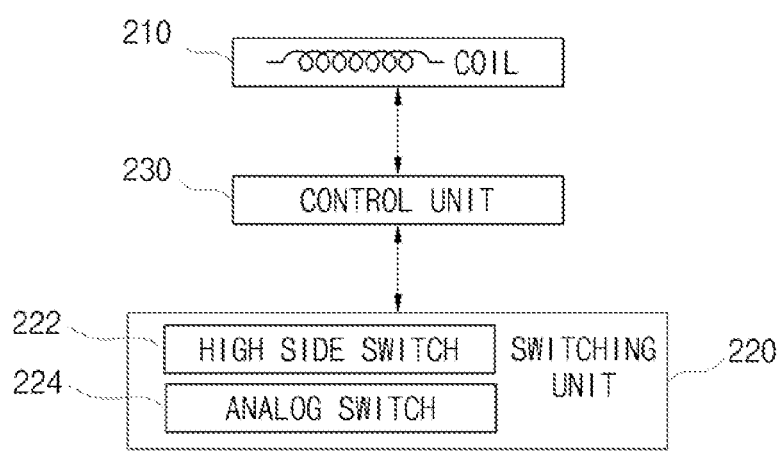
FIG. 2 is a block diagram of a smartkey operating system equipped with a wireless charging function which includes a coil used for wireless charging and wireless response, according to an embodiment of the present invention.

FIG. 2 is a block diagram of a smartkey operating system equipped with a wireless charging function which includes a coil used for wireless charging and wireless response, according to an embodiment of the present invention.

As illustrated in FIG. 2, the smartkey operating system equipped with the wireless charging function includes a coil 210, a switching unit 220, and a control unit 230.

The coil 210 includes two functions such as a wireless charging function and a data communication function.

The switching unit 220 includes a high side switch 222 and an analog switch 224. In detail, the high side switch 222 cuts off or supplies the wireless charging power, and the analog switch 224 switches the coil 210 according to a wireless charging operation or a data communication operation.

The control unit 230 determines whether to cut off the wireless charging power and the use of the coil 210, and controls the switching unit 220 according to the determination result. In detail, when a current mode is the sleep mode or the fob search mode, the control unit 230 cuts off the wireless charging power by using the high side switch 222.

Moreover, a fob battery is discharged, and when an emergency start button is in a turn-on state or a fob diagnosis learning request is acquired, the control unit 230 controls the analog switch 224 to be used for wireless response.

Figure 3:
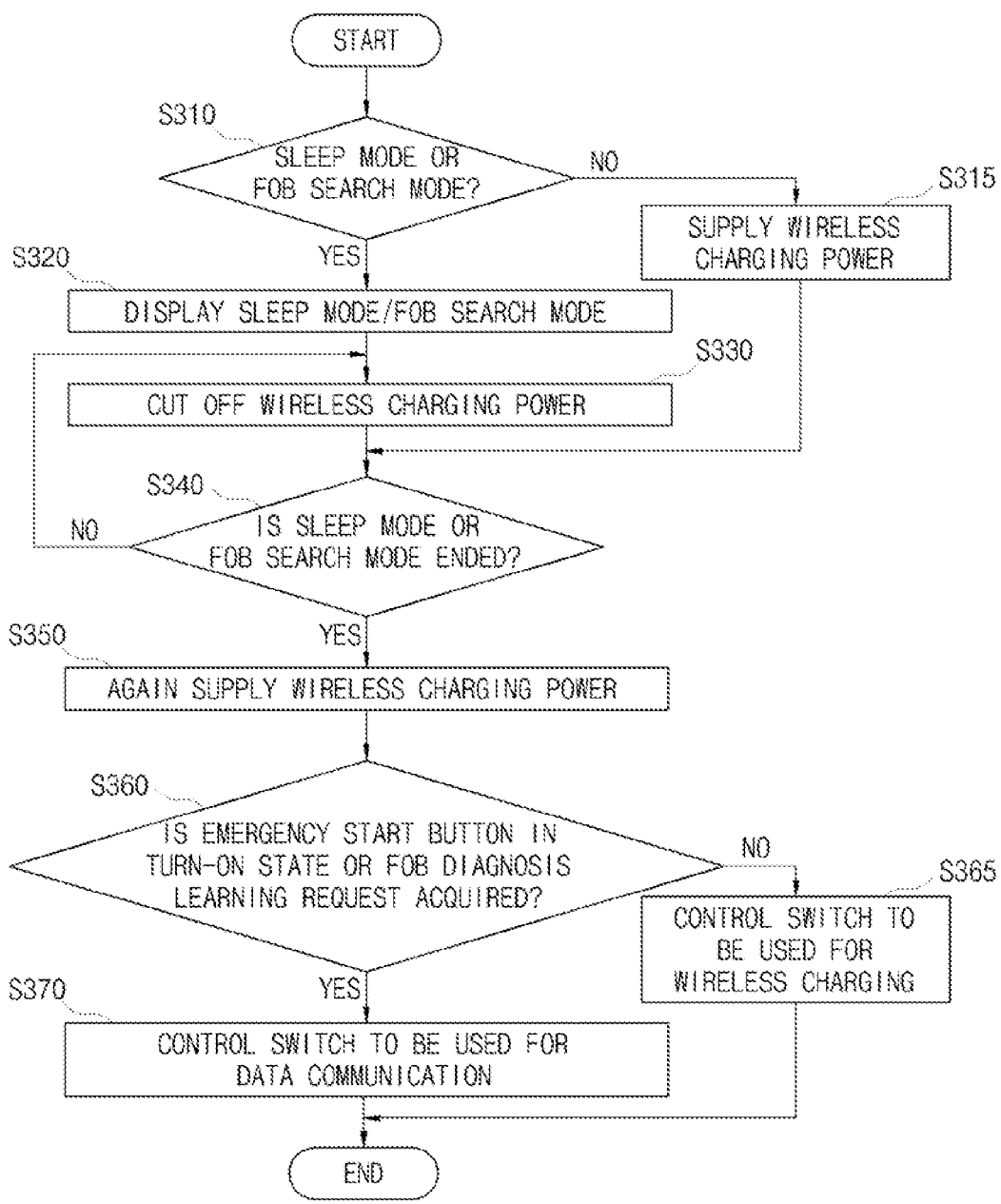
FIG. 3 is a flowchart of a method of operating the smartkey operating system equipped with the wireless charging function which includes the coil used for wireless charging and wireless response, according to an embodiment of the present invention.

FIG. 3 is a flowchart of a method of operating the smartkey operating system equipped with the wireless charging function which includes the coil used for wireless charging and wireless response, according to an embodiment of the present invention.

As illustrated in FIG. 3, the smartkey operating system first checks a current mode in operation S310. In detail, examples of the current mode include the default mode, the sleep mode, and the fob search mode. The modes have been described above with reference to FIG. 1.

When the current mode is the sleep mode, the smartkey operating system displays a sleep-mode state, or when the current mode is the fob search mode, the smartkey operating system displays a fob search state, in operation S320. Here, the fob search state is a state in which the smartkey operating system drives the LF antenna to search for a fob. In detail, the display unit 130 displays the sleep-mode state or the fob search state. Therefore, a user determines the current mode as the sleep mode or the fob search mode, and thus, it can be seen that the wireless charging power is cut off.

Subsequently, when the current mode is the sleep mode or the fob search mode, the smartkey operating system cuts off the wireless charging power in operation S330. In detail, the smartkey operating system cuts of the wireless charging power by using the high side switch 222. Accordingly, when entering the sleep mode, the smartkey operating system cuts off the wireless charging power, thereby preventing the dark current from being generated.

Subsequently, the smartkey operating system determines whether the sleep mode or the fob search mode is ended, in operation S340.

When it is determined that the sleep mode or the fob search mode is ended, the smartkey operating system supplies the wireless charging power in operation S350. In detail, the smartkey operating system supplies the wireless charging power through the high side switch 222. That is, only when the current mode is the sleep mode or the fob search mode, the wireless charging power is cut off, and when the sleep mode or the fob search mode is ended, the mode of the smartkey operating system is switched to the default mode that supplies the wireless charging power.

Moreover, when the emergency start button is in a turn-off state and the fob diagnosis learning request is not acquired, a switching operation for wireless charging is performed in operation S365. In detail, the switching operation for wireless charging is performed by the analog switch 224.

Finally, the fob battery is discharged, and when the emergency start button is in a turn-on state or the fob diagnosis learning request is acquired, a switching operation for data communication is performed in operation S370. In detail, the switching operation for data communication is performed by the analog switch 224.

According to the present invention, a data communication operation is performed in two cases. A first case is a case in which when the fob battery is discharged, by turning the emergency start button, a fob is searched through the LF antenna. A second case is a case in which the fob diagnosis learning request is acquired. Only in the two cases, the control unit 230 turns on the analog switch 224 for a certain time (for example, one second), thereby allowing the coil to be used for data communication. In other cases, the coil is used for wireless charging. Accordingly, the one coil is used for two purposes. That is, the wireless charging operation corresponds to a default state, and the data communication operation corresponds to a state that occurs in only a special case.

As described above, the default mode in which charging power is wirelessly supplied is ordinarily maintained, and the present invention determines whether to cut off the wireless charging power to control the switching unit according to the sleep mode or the fob search mode in wireless charging. When it is determined that a current mode is the sleep mode or the fob search mode, the present invention cuts off the wireless charging power.

Therefore, a frequency used by the wireless charger does not overlap a low frequency used by a smartkey, and thus, the present invention can search for a fob in wireless charging, thereby providing convenience to a user.

Moreover, when a smartkey enters the sleep mode, the present invention cuts off wireless charging power, thereby preventing a dark current from being generated.

In addition, the present invention enables one coil to be used for data communication and wireless charging, and thus, in comparison with the related art that uses two coils, the number of wires connected to the one coil can be reduced. Accordingly, a product can be lightened, and the number of components can be reduced, thereby decreasing the manufacturing cost.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A smartkey charging apparatus equipped with a wireless charging function, which supplies wireless charging power, the smartkey charging apparatus comprising:
    a switching unit configured to cut off or supply the wireless charging power; and
    a control unit configured to determine whether to cut off the wireless charging power according to a current mode, wherein in response to the current mode being a fob search mode, the control unit cuts off the wireless charging power for at least the duration of the fob search mode by controlling the switching unit.

2. The smartkey charging apparatus of claim 1, wherein
    the switching unit comprises a high side switch, and
    the switching unit cuts off the wireless charging power by using the high side switch.

3. The smartkey charging apparatus of claim 1, wherein in response to the current mode being a sleep mode, the control unit cuts off the wireless charging power by using the switching unit.

4. The smartkey charging apparatus of claim 3, further comprising a display unit configured to display a sleep-mode state according to a control command of the control unit in response to the current mode being the sleep mode.

5. The smartkey charging apparatus of claim 4, wherein the display unit displays a fob search-mode state according to the control command of the control unit in response to the current mode being the fob search mode.

6. The smartkey charging apparatus of claim 4, wherein the display unit displays a wireless charging power supply state according to the control command of the control unit in response to the current mode being a default mode.

7. A smartkey charging apparatus equipped with a wireless charging function, the smartkey charging apparatus comprising:
    a coil configured to be used for wireless charging and data communication;
    a switching unit configured to include a high side switch, which cuts off or supplies wireless charging power, and an analog switch that switches the coil according to an operation; and
    a control unit configured to control the switching unit by determining whether to cut off the wireless charging power and a use of the coil for at least the duration of a current mode in response to the current mode being a sleep mode or a fob search mode.

8. The smartkey charging apparatus of claim 7, wherein in response to the current mode being the sleep mode, the control unit controls the high side switch to cut off the wireless charging power.

9. The smartkey operating charging apparatus of claim 7, wherein in response to the current mode being the fob search mode, the control unit controls the high side switch to cut off the wireless charging power.

10. The smartkey charging apparatus of claim 7, wherein in response to the current mode being a default mode, the control unit controls the high side switch to supply the wireless charging power.

11. The smartkey charging apparatus of claim 7, wherein in response to an emergency start button being in a turn-on state, the control unit controls the analog switch to be used for wireless response.

12. The smartkey charging apparatus of claim 7, wherein in response to a fob diagnosis learning request being acquired, the control unit controls the analog switch to be used for wireless response.

13. A method of operating a smartkey charging apparatus equipped with a wireless charging function, which supplies wireless charging power and in which a switch is ordinarily used for wireless charging, the method comprising:
    cutting off the wireless charging power, for at least the duration of a sleep mode or a fob search mode, in response to a current mode being the sleep mode or the fob search mode;
    supplying the wireless charging power in response to the sleep mode or the fob search mode ending; and switching the switch to be used for data communication in response to a fob battery being discharged, and an emergency start button is in a turn-on state or a fob diagnosis learning request is acquired.

14. The method of claim 13, wherein the switching of the switch comprises switching an analog switch.

15. The method of claim 13, further comprising displaying a sleep-mode state in response to a current mode being the sleep mode, or displaying a fob search-mode state in response to the current mode being the fob search mode.

16. The method of claim 13, further comprising switching the switch to be used for wireless charging in response to the emergency start button being in a turn-off state or the fob diagnosis learning request is not acquired.

17. The method of claim 16, wherein the switching of the switch comprises controlling an analog switch to switch the switch.

\* \* \* \* \*